United States Patent [19]

Bhatia

[11] Patent Number: 4,465,800

[45] Date of Patent: Aug. 14, 1984

[54] INK COMPOSITION FOR INK JET PRINTING

[75] Inventor: Yog R. Bhatia, Glen Ellyn, Ill.

[73] Assignee: A. B. Dick Company, Chicago, Ill.

[21] Appl. No.: 474,173

[22] Filed: Mar. 10, 1983

[51] Int. Cl.³ .................. C09D 3/54; C09D 3/56; C08L 61/10

[52] U.S. Cl. .................. 524/236; 524/317; 524/364; 524/376; 524/378; 524/389; 524/503; 524/594; 524/596

[58] Field of Search ............... 524/236, 389, 376, 378, 524/364, 317

[56] References Cited

U.S. PATENT DOCUMENTS

| | | | |
|---|---|---|---|
| 4,021,252 | 3/1977 | Banzak | 106/26 |
| 4,155,767 | 5/1979 | Specht | 524/113 |
| 4,155,895 | 5/1979 | Rohowetz et al. | 106/22 |
| 4,168,662 | 9/1979 | Fell | 106/22 |
| 4,210,566 | 7/1980 | Murray | 106/22 |

OTHER PUBLICATIONS

Bogle, *Textile Dyes, Finishes and Auxiliaries;* pp. 57 and 66; Garland Publishing, Inc., N.Y., 1977.

*Primary Examiner*—C. Warren Ivy
*Attorney, Agent, or Firm*—McDougall, Hersh & Scott

[57] ABSTRACT

An ink composition for use in ink-jet printing to print images on a substrate, the composition being formulated to include, as the resin component, a phenolic resole resin and, as the primary solvent, a lower alkanol. The composition is also formulated to contain a pigment or soluble basic dye, a resistivity control agent preferably in the form of hydroxylamine hydrochloride, an evaporation retardant, and a modifying resin. The use of a phenolic resole resin which is capable of undergoing cure on evaporation of the solvent provides a printed image having improved adherence to various printing substrates and can be formulated and dissolved in less toxic, lower alkanol solvents.

7 Claims, No Drawings

INK COMPOSITION FOR INK JET PRINTING

This invention relates to ink-jet printing, and more specifically to an ink composition for use in ink-jet printing which has improved adherence to printing substrates.

Ink-jet printing is now well known, and is a technique by which printing is effected without contact between the printing device and the substrate on which the printed characters are deposited. Briefly described, ink-jet printing involves the technique of projecting a stream of droplets to a surface and controlling them electronically so that the droplets are caused to form a printed image. The technique is particularly well suited for applications of printing on irregularly-shaped surfaces, including for example, the bottom of metal beverage containers.

The characteristics of an ink-jet printing ink, as is well known, should be carefully controlled. For example, the ink composition not actually deposited on the substrate is collected and diverted to an ink return tank. Thus it is necessary to maintain the ink level in the equipment to assure a relatively constant viscosity even though evaporation losses do occur. It is also important to control the physical characteristics of the composition, namely its viscosity, electrical resistivity, surface tension, sonic velocity and specific gravity.

Ink-jet printing compositions have generally been formulated to contain a binder component in the form of a resin, a soluble dye stuff and a solvent. In addition, many ink compositions are also formulated to include evaporation retardants to control evaporative losses from the system, resistivity control agents to adjust the electrical resistivity of the ink and miscellaneous other conventional components.

The binder or resin component of an ink composition for use in ink-jet printing serves the purpose, among others, of promoting adhesion of the printed image to the substrate on which the printing is effected. A variety of resin binders have been proposed for use in ink compositions, such as those described in U.S. Pat. No. 4,210,566. The specific resins include epoxy-phenolic resins and phenol-modified rosin ester resins. One of the primary difficulties of ink compositions described in that patent is that they are slow drying.

U.S. Pat. No. 4,155,767 suggests the use of a resole resin but that resin necessitates the use of a highly toxic solvent such as tetrahydrofuran. U.S. Pat. Nos. 4,024,096 and 4,045,397 suggest the use of linear novalak resins which can be formulated with less toxic alcohol solvents. Unfortunately, however, such resins do not provide optimum adhesion to some metal substrates.

It is accordingly an object of the present invention to provide an ink composition for use in ink-jet printing which overcomes the foregoing disadvantages.

It is a more specific object of the present invention to provide an ink composition for use in ink-jet printing which is formulated to contain a resin capable of being securely bonded to printing substrates and which can be formulated mainly with inexpensive less toxic solvents.

It is a more specific object of this invention to provide an ink composition for use in ink-jet printing which is formulated to include a phenolic resole resin capable of undergoing cure on evaporation of the solvent which can be formulated with a lower alkanol solvent.

The concepts of the present invention reside in an ink composition for use in ink-jet printing which is formulated to include, as the resin component, a phenolic resole resin which is capable of undergoing cure after evaporation of solvents with aging or heat without melting to provide better adhesion to the printing substrate. It has been found that binders of that type can be formulated with inexpensive, less toxic solvents, notably lower alkanols containing 1–3 carbon atoms, and particularly methanol and/or ethanol. It has been discovered that an ink composition embodying a phenolic resole resin and a lower alkanol and, optionally, a ketone as the main solvents provides improved adhesion to printing substrates which have lubricants on their surfaces. Without limiting the present invention as to theory, it is believed that the improved adhesion is caused by the ability of the phenolic resole resin to cure after evaporation of the solvent with aging or heating, without melting at elevated temperatures.

As will be appreciated by those skilled in the art, the ink composition of the present invention is also formulated to include conventional components of ink compositions for ink-jet printing applications, notably evaporation retardant to reduce solvent losses, soluble dyes or pigments to impart the desired color to the printing image and various soluble organic salts to stabilize the ink composition and to control the resistivity of the ink composition.

The phenolic binders employed in the practice of this invention are phenolic resole resins prepared by condensation of phenol and formaldehyde with an excess of formaldehyde. A typical resole resin has the structural formula:

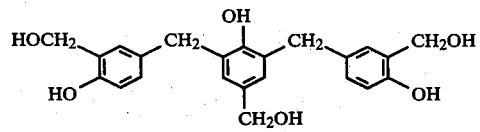

The ink composition of the invention can be formulated with the phenolic resole resin component of this invention, either alone or in combination with small amounts of other film-forming resins. As the phenolic resole resin, use is generally made of commercially-available resins, including Bakelite BLS 2700, marketed by Union Carbide Corporation containing a phenolic resole resin dissolved in 10% water and 35% ethanol; Resinox 594, a phenolic resole resin marketed by Monsanto Co. containing 25% ethanol and 10% water and GP 5137, a phenolic resole resin marketed by Georgia-Pacific Corp. containing 25% ethanol and 10% water.

In accordance with one preferred embodiment of the invention, the ink composition of the invention is also formulated to include a small amount of modifying resin, preferably a butyral resin. It has been found that the use of such a butyral resin in the ink serves to promote a reaction with the methylol groups of the phenolic resole resin to provide a highly cross-linked resin to securely adhere the printed image to the substrate. Such cross linking can occur after evaporation of the solvent or solvents, either with aging or with heat. Again, use can be made of commercially-available butyral resins, and preferably vinyl butyral resins such as Bakelite XYHL, a vinyl butyral resin marketed by Union Carbide Corp. Other modifying resins can also be used in small quantities as additives, for example, styrene-acrylic acid copolymers, rosin, rosin esters, polyvinyl alcohols, acrylic polymers and epoxies.

The amount of phenolic resole resin employed in the ink composition of the invention can be varied within relatively wide limits, depending somewhat on the particular printing application. In general, use is made of the resole resin in an amount corresponding to 2–30% by weight based on the weight of the ink composition, and preferably 8–20% by weight. When use is made of the vinyl butyral resin, amounts sufficient to effect cross linking are usually employed, that is generally amounts up to 1% by weight. In the preferred embodiment, amounts of vinyl butyral resin employed range up to 0.2% by weight.

As indicated above, one of the advantages of the present invention is that the ink composition can be formulated to include relatively inexpensive less toxic ingredients as the main solvent, notably lower alkanols such as methanol, ethanol and propanol or mixtures thereof and, as optional additional solvents, lower aliphatic saturated ketones, such as acetone, dimethyl ketone, methylethyl ketone, methylpropyl ketone, methyl isobutyl ketone and ethylpropyl ketone. In general, the ketone solvent, when employed, contains 2 to 6 carbon atoms and is present in an amount ranging up to 30% by weight. Generally, the amount of the solvent makes up the balance of the composition, after addition of the other ingredients. The solvent usually ranges up to about 75% by weight based on the weight of the composition. It is also possible to include, as secondary solvent components, water in amounts ranging up to 30% by weight, and preferably 2 to 5% by weight, and much lesser amounts of lower aliphatic esters of alkanoic acids of $C_2$ to $C_5$, preferably less than 5% by weight.

It is also desirable in the practice of the invention, to formulate the ink to include amine salt additives for the purpose of promoting stability and resistivity in the composition. Good results have been obtained in the practice of this invention by using as a soluble organic salt, hydroxylamine hydrochloride in amounts ranging from 0.02 to 5%, and preferably 0.1 to 0.8%, to stabilize and to control the resistivity of the ink composition. It is sometimes desirable, especially when a ketone solvent is used, to also include with the hydroxylamine hydrochloride the additional amine salt additive dimethylamine hydrochloride in amounts ranging up to 5%, and preferably up to 1% by weight.

The ink composition of the invention is also formulated to include basic dyes to impart the desired color to the composition. Quite a variety of basic dyes can be used for that purpose. Representative dyes include Crystal Violet FN, marketed by BASF Wyandotte Corp., Victoria Blue B base dye stuffs from Hilton Davis, as well as numerous other alochol and water soluble dye stuffs. Preferred dye stuffs are triaryl methane dye stuffs. The dyes employed in the ink composition of this invention are generally present in an amount of 0.2 to 5% by weight and preferably 1 to 3% by weight.

While not essential to the practice of the invention, the ink composition of this invention can also be formulated to include evaporation retradants for the purpose of retarding evaporation of the solvents. Such evaporation retardants are conventionally used in ink-jet printing compositions. In general, it is preferred to employ an evaporation retardant in the form of glycol ether, glycol ester, or combinations thereof. Representative of such materials are ethylene glycol monomethyl ether, ethylene glycol dimethyl ether, ethylene glycol monoethyl ether, ethylene glycol diethyl ether, ethylene glycol monobutyl ether, ethylene glycol monophenol ether, ethylene glycol mono-2-ethylbutyl ether, diethylene glycol monomethyl ether, diethylene glycol monoethyl ether, ethylene glycol monomethyl ether acetate, ethylene glycol monoethyl ether acetate, diethylene glycol monomethyl ether acetate, propylene glycol methyl ether and dipropylene glycol methyl ether.

When present, the evaporation retardant is present in an amount ranging up to about 50% by weight, and preferably within the range of 5 to 15% by weight, based on the weight of the ink compositions.

As will be appreciated by those skilled in the art, other components, including resins, plasticizers, solvents, dyes and pigments can also be employed in the ink composition of this invention in small quantities as additives to modify the properties of the ink for particular applications.

In general, it is preferred that the ink compositions of the invention have the following properties:

| Range For Properties Of The Ink | | |
|---|---|---|
| | Preferred Range (%) | Broad Range (%) |
| pH | 3–6 | 1–7 |
| Specific resistivity (ohm-cm) | 400–1500 | 50–3000 |
| Viscosity (cp at 20° C.) | 1.5–5 | 0.5–20 |
| Sonic Velocity (meters/sec.) | 1150–1300 | 900–2000 |
| Specific gravity | 0.86–0.93 | 0.8–1.0 |

Having described the basic concepts of the invention, reference is now made to the following examples which are provided by way of illustration, and not by way of limitation, of the practice of the invention in the formulation of ink compositions for use in ink-jet printing.

EXAMPLE 1

An ink composition of this invention was formulated as follows:

| | Parts by Weight |
|---|---|
| Methanol | 56.4 |
| 55% solution of resole resin in ethanol (Bakelite BLS 2700) | 24.0 |
| Ethyleneglycol ethyl ether | 10.0 |
| Vinyl butyral resin (Bakelite XYHL) | .06 |
| Hydroxylamine hydrochloride | .10 |
| Basic Violet 3 (BASF Wyandotte) | 2.20 |
| Hydroxylamine hydrochloride | .34 |

The composition was prepared by placing the methanol solvent in a one-liter beaker, and thereafter adding the solution of the resole resin followed by mixing for 15 minutes. The ethyleneglycol ethyl ether was then added. Thereafter, the vinyl butyral resin was added and the resulting mixture mixed for 15 minutes.

Following those additions, the hydroxylamine hydrochloride, the dye and additional hydroxylamine hydrochloride were added, with mixing for each of 15 minutes, 30 minutes and one hour, respectively.

Thereafter, the ink was filtered through Whatman No. 3 filter paper and then a one micron polycarbonate filter. Analysis of the ink revealed a pH of 5.2, a specific resistivity of 570 ohm-cm, a specific gravity of 8.8, a viscosity of 2.2 cps and a sonic velocity of 1217 m/sec.

EXAMPLE 2

This example illustrates another composition embodying the concepts of this invention.

|  | Parts by Weight |
| --- | --- |
| Methanol | 182.5 |
| Ethyleneglycol ethyl ether | 50.0 |
| Methyl ethyl ketone | 100.0 |
| 55% solution of resole resin (Bakelite BLS 2700) | 120.0 |
| Dimethylamine hydrochloride | 4.0 |
| Hydroxylamine hydrochloride | 0.8 |
| Basic Violet 3 | 11.0 |

The methanol solvent was placed in a one-liter beaker, and the remainder of the components were added in the order in which they appear above while mixing. Mixing was continued for an additional one hour, and the composition filtered using the procedure described in Example 1.

The properties of the ink are given below:

| pH | 5.2 |
| --- | --- |
| Viscosity, cp | 1.9 |
| Specific resistivity, ohm-cm | 950 |
| Velocity of sound, m/sec. | 1256 |

EXAMPLE 3

Using the same procedure described in Example 2, an ink composition was formulated as follows:

|  | Parts by Weight |
| --- | --- |
| Methanol | 318 |
| 65% solution of resole resin (Rosinox 594) | 102 |
| Ethyleneglycol ethyl ether | 25 |
| Dimethyleneglycol ethyl ether | 7.5 |
| Basic Violet 3 | 7.5 |
| Hydroxylamine hydrochloride | 0.5 |

The properties of the ink are given below:

| pH | 5.0 |
| --- | --- |
| Specific resistivity, ohm-cm | 960 |
| Velocity of sound, m/sec. | 1225 |
| Viscosity, cp | 2.0 |
| Specific gravity | 0.88 |

EXAMPLE 4

Using the same procedure described in Example 2, an ink composition was formulated as follows:

|  | Parts by Weight |
| --- | --- |
| Methanol | 300 |
| 55% solution of resole resin (Bakelite BLS 2700) | 120 |
| Ethyleneglycol ethyl ether | 25 |
| Diethyleneglycol ethyl ether | 7.5 |
| Basic Blue 81 | 6.0 |
| Hydroxylamine hydrochloride | 1.0 |

The properties of the ink are given below:

| pH | 6.1 |
| --- | --- |
| Specific resistivity, ohm-cm | 1160 |
| Velocity of sound, m/sec. | 1224 |
| Viscosity, cp | 2.76 |

EXAMPLE 5

Using the same procedure described in Example 2, an ink composition was formulated as follows:

|  | Parts by Weight |
| --- | --- |
| Methanol | 300 |
| 55% solution of resole resin (Bakelite BLS 2700) | 120 |
| Ethyleneglycol ethyl ether | 25 |
| Diethyleneglycol ethyl ether | 7.5 |
| Basic Violet 10 | 7.5 |
| Hydroxylamine hydrochloride | 0.5 |

The properties of the ink are given below:

| pH | 6.4 |
| --- | --- |
| Specific resistivity, ohm-cm | 1040 |
| Velocity of sound, m/sec. | 1220 |
| Viscosity, cp | 2.5 |
| Specific gravity | 0.88 |

EXAMPLE 6

Using the same procedure described in Example 2, an ink composition was formulated as follows:

|  | Parts by Weight |
| --- | --- |
| Methanol | 300 |
| 62% solution of resole resin (GP 5137) | 120 |
| Ethyleneglycol ethyl ether | 25 |
| Diethyleneglycol ethyl ether | 7.5 |
| Basic Violet 3 | 7.5 |
| Hydroxylamine hydrochloride | 0.5 |

The properties of the ink are given below:

| pH | 6.4 |
| --- | --- |
| Specific resistivity, ohm-cm | 1150 |
| Velocity of sound, m/sec. | 1227 |
| Viscosity, cp | 1.8 |
| Specific gravity | 0.88 |

EXAMPLE 7

Using the same procedure described in Example 2, an ink composition was formulated as follows:

|  | Parts by Weight |
| --- | --- |
| Methanol | 300 |
| 55% solution of resole resin (Bakelite BLS 2700) | 120 |
| Ethyleneglycol ethyl ether | 25 |
| Diethyleneglycol ethyl ether | 7.5 |
| Basic Violet 10 | 7.5 |
| Hydroxylamine hydrochloride | 0.5 |
| Deionized water | 23 |

The properties of the ink are given below:

| | |
|---|---|
| pH | 5.9 |
| Specific resistivity, ohm-cm | 1080 |
| Velocity of sound, m/sec. | 1267 |
| Viscosity, cp | 2.5 |
| Specific gravity | 0.9 |

ADHESION TESTS

The ink described in Example 1, a commercially-available ink named Amjet P473, marketed by American Can Co., and A. B. Dick Company commercial ink No. 16-7800, 16-7600 and 16-7400, were subjected to adhesion tests. A sample of each of the foregoing inks was applied on a tin-free steel specimen using an A. B. Dick Series 9000 ink-jet printer. The printed images were then air dried for one second.

Immediately thereafter, each specimen was placed in boiling water and boiled for two hours. The printed images of the ink from Example 1 was still in place and exhibited excellent adhesion. For example, the printed image could not be removed even after applying ten finger rubs. In contrast, only a faint impression of the printed image of the Amjet P473 ink remained on the test specimen, while the printed images from the rest of the inks were removed during the boiling in water.

The same test as described above was repeated on glass jars instead of steel specimens using the A. B. Dick and American Can commercially-available inks and the ink composition of Example 2. After boiling in water for two hours, the printed image formed from the ink of Example 2 was found to be still in place, thus exhibiting good adhesion. It was not removed with ten firm finger rubs. The printed images from the P473, 16-7800 and 16-7600 inks came off completely under the same conditions while the printed image from ink 16-7400 was partially removed.

When the same test was repeated with the inks of Examples 3-7, inclusive, the same results were obtained. After boiling for two hours, the printed images from each of the inks of Examples 3-7 remained in place while those formed from the above comercially-available ink compositions were completely removed after two hours of boiling.

It will be understood that various changes and modifications can be made in the details of formulation and use without departing from the spirit of the invention, especially as defined in the following claims.

I claim:

1. An ink composition for use in ink-jet printing consisting essentially of:
   (a) 2 to 30% by weight of a phenolic resole resin prepared by condensation of phenol and formaldehyde in the presence of an excess of formaldehyde
   (b) 0.2 to 7.5% by weight of a soluble triarylmethane basic dye;
   (c) 0.02 to 5% by weight of a soluble organic amine salt;
   (d) 0 to 50% by weight of at least one evaporation retardant;
   (e) up to 30% by weight of water;
   and the balance being at least one $C_1$ to $C_3$ alkanol as a solvent; said ink composition having a specific resistivity of 50 to 3000 ohm-cm, a viscosity at 20° C. of 0.5 to 30cp, and a sonic velocity of 900 to 2000 meters per second.

2. A composition as defined in claim 1 which includes up to 1% by weight of a butyral resin as a modifying resin.

3. A composition as defined in claim 1 wherein the alkanol is methanol.

4. A composition as defined in claim 1 wherein the evaporation retardant is a lower aliphatic glycol ether.

5. A composition as defined in claim 1 wherein the soluble organic salt is hydroxylamine hydrochloride.

6. A composition as defined in claim 1 which includes, as a solvent, up to 50% by weight, based on the weight of the composition, of a lower aliphatic ketone and up to 1% by weight of dimethylamine hydrochloride to reduce the resistivity of the composition.

7. A composition as defined in claim 1 wherein the composition has a pH within the range of 1 to 7.

* * * * *